(No Model.)
O. M. MOSHER.
WIRE STRETCHING MACHINE.
No. 437,612.   Patented Sept. 30, 1890.
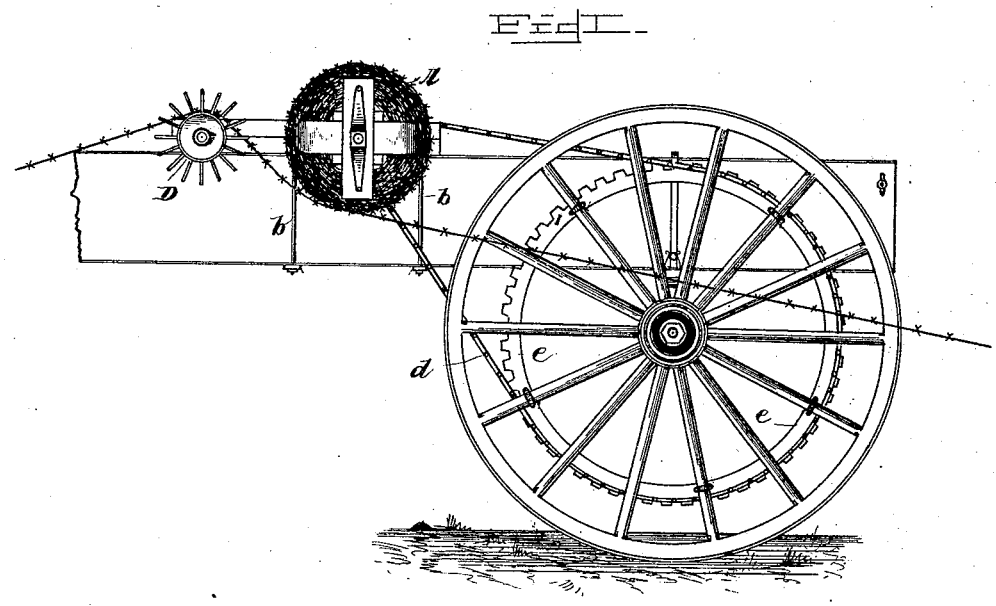
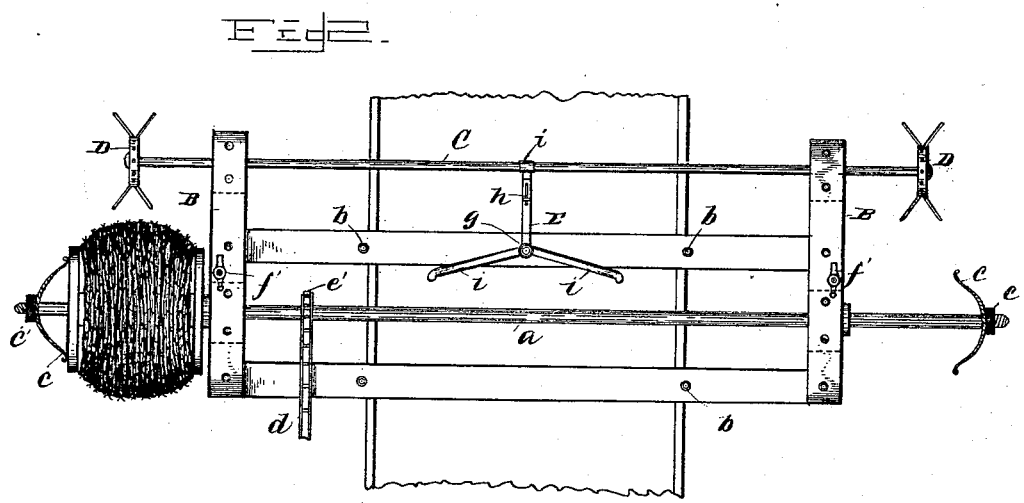
Witnesses
S. P. Hart
W. W. Beach
Oscar M. Mosher   Inventor

UNITED STATES PATENT OFFICE.

OSCAR M. MOSHER, OF GLIDDEN, ASSIGNOR OF ONE-THIRD TO M. W. BEACH, OF CARROLL COUNTY, IOWA.

WIRE-STRETCHING MACHINE.

SPECIFICATION forming part of Letters Patent No. 437,612, dated September 30, 1890.

Application filed June 17, 1889. Serial No. 314,611. (No model.)

*To all whom it may concern:*

Be it known that I, OSCAR M. MOSHER, a citizen of the United States, residing at Glidden, in the county of Carroll and State of Iowa, have invented a new and useful Wire Distributing, Gathering, and Stretching Machine, of which the following is a specification.

This invention relates to certain improvements in wire-stretching machines, having for its object to unreel or pay out the wire in one direction while winding or reeling it in the opposite direction, and to provide for stetching or tightening the wire as it is paid out or unreeled, as also to effect the proper distribution or laying of the wire upon the reel as it is being wound or reeled; and it consists in the novel combination and construction of parts, as will appear from the following description and accompanying illustrations, in which—

Figure 1 is a side elevation of a vehicle, partly broken away, showing my invention as applied thereto; and Fig. 2 is a plan view of the same, partly broken away.

In the embodiment of my invention I employ a reel or drum A, upon which the wire is wound or reeled, as shown. The reel or drum is carried by a shaft $a$, journaled upon the under side of the transverse bars of a frame B, mounted upon a vehicle or wagon. This frame is suitably secured upon the vehicle and transversely to it, preferably by bolt-rods $b\,b$, which extend down alongside of the latter and are passed through and bolted to cross-bars placed against its under side. The reel or drum A is held in position under the action of a spring $c$, in turn held against displacement by a nut $c'$, fitted upon a screw-thread on the shaft $a$, near one end thereof. This arrangement permits the drum or reel to slip on the shaft in event of the kinking or knotting of the wire, the wire in that case, with the reel or drum, experiencing a jerking action, which would otherwise be liable to damage or displace the reel with its shaft.

The reel, with its shaft, is driven by an endless chain or belt $d$ encompassing a large toothed wheel $e$, secured to one of the vehicle-wheels, and a similar but smaller wheel $e'$ on said shaft.

$f'$ is a pivoted lever or stop, so applied to the frame B as to be thrown into engagement with the spokes of the reel or drum A to prevent, when necessary, the rotation thereof, and then by the slight forward movement of the team the wire is stretched or tightened, which operation can, it is obvious, be repeated as often as may be required throughout the operation of paying out or unreeling the wire.

C is a shaft, which is journaled upon the under side of one of the end or transverse bars of the frame B and which carries at one end a guide-wheel D. Over this wheel the wire, as it is reeled upon the drum or reel A, is guided and carried, so as to lay or distribute it properly upon said reel or drum, said wheel, with its shaft, having a lateral movement parallel with the longitudinal plane or axis of said drum or reel. This movement is obtained by means of a shifting or adjusting contrivance which comprises a three-arm lever E, pivoted, as at $g$, at the point of conjunction of its three arms upon a longitudinal bar of the frame B. Two of the arms of the lever E stand proximately at right angles to its third arm, being slightly deflected rearward, and adapted to be actuated by pressure from the driver's feet. The said third arm of the lever E is slotted at its forward end to receive a pin or stud $h$ on a projection or arm of a T-piece $i$, applied about at the center of the shaft C, whereby when the lever E is actuated the shaft C, with its wheel D, can be moved in a plane parallel with the shaft $a$, as above intimated, for the purpose aforesaid stated.

Having thus fully described my invention, what I claim, and desire to secure by Letters Patent, is—

In a wire-stretching machine, the frame secured to the wagon-body, the drums or reels adjustably secured on their shaft by means of springs arranged on the ends thereof and operated by a chain or belt encompassing gear-wheels secured on the carrying-wheel of the vehicle and on the shaft of the drums, the guide-wheels or pulleys having the converging spokes or rods projected therefrom, and their shaft having a slotted pivotal connection at its center with one arm of a lever centrally pivoted to the frame, its free arms being actuated by the driver's feet in throwing the guide-pulleys backward and forward horizontally in effecting the winding of the wire on the drums, substantially as shown and described.

OSCAR M. MOSHER.

Witnesses:
J. R. WHITNEY,
A. SCHARMEELER.